US007144631B2

(12) United States Patent
Lin et al.

(10) Patent No.: US 7,144,631 B2

(45) Date of Patent: Dec. 5, 2006

(54) METHOD FOR ACHIEVING PRIMERLESS WINDSHIELD SEALANT ADHESION OVER A CARBAMATE CLEARCOAT

(75) Inventors: Jun Lin, Troy, MI (US); Leatrese Dionne Hopkins, Flint, MI (US); David M. Zukowski, Sterling Heights, MI (US); Scott W. Loper, Canton, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 352 days.

(21) Appl. No.: 10/703,641

(22) Filed: Nov. 7, 2003

(65) Prior Publication Data

US 2005/0100740 A1 May 12, 2005

(51) Int. Cl.
*B32B 27/40* (2006.01)
*B32B 27/38* (2006.01)
*B32B 27/26* (2006.01)
*B05D 1/36* (2006.01)

(52) U.S. Cl. .................. 428/423.1; 428/414; 428/446; 428/447; 427/301; 427/409; 427/410

(58) Field of Classification Search .................... None
See application file for complete search history.

(56) References Cited

U.S. PATENT DOCUMENTS 4,499,151 A 2/1985 Dowbenko et al.
5,102,961 A 4/1992 Blank
5,215,783 A 6/1993 Harper
5,225,248 A 7/1993 Stephenson
5,331,050 A 7/1994 Harper
5,356,987 A 10/1994 Stephenson
5,413,809 A 5/1995 Hazan
5,552,184 A * 9/1996 Klostermann et al. ...... 427/284
5,852,137 A 12/1998 Hsieh et al.
6,239,212 B1 5/2001 Green
6,451,930 B1 9/2002 Burgman et al.
6,458,463 B1 10/2002 Yoshioka et al.
6,492,482 B1 * 12/2002 Lomoelder et al. ........... 528/38
6,855,792 B1 * 2/2005 Speier et al. ................. 528/28
2002/0042471 A1 * 4/2002 Lomoelder et al. ......... 524/589
2002/0103286 A1 * 8/2002 Speier et al. ............... 524/492
2003/0027921 A1 * 2/2003 Speier et al. ............... 524/589

FOREIGN PATENT DOCUMENTS

WO WO 00/55229 9/2000

OTHER PUBLICATIONS

PCT International Search Report.

* cited by examiner

*Primary Examiner*—Michael J. Feely
(74) *Attorney, Agent, or Firm*—Chyrrea J. Sebree

(57) ABSTRACT

A method for adhering windshield sealants directly over a basecoat/clearcoat finish in which the clearcoat comprises a carbamate polymer or oligomer.

12 Claims, No Drawings

METHOD FOR ACHIEVING PRIMERLESS WINDSHIELD SEALANT ADHESION OVER A CARBAMATE CLEARCOAT

BACKGROUND OF THE INVENTION

This invention is directed to a method for achieving windshield sealant adhesion over a basecoat/clearcoat finish in which the clearcoat composition comprises a carbamate polymer or oligomer. In particular, this invention is directed to a method for obtaining primerless windshield sealant adhesion over a carbamate clearcoat, especially during automobile or truck assembly operations.

In order to protect and preserve the aesthetic qualities of the finish on an automobile or other vehicle, it is generally known to provide a clear (unpigmented or slightly pigmented) topcoat over a colored (pigmented) basecoat, so that the basecoat remains unaffected even on prolonged exposure to the environment or weathering. This is referred to as a basecoat/clearcoat finish. It is also generally known that carbamate polymers alongside melamine crosslinking agents provide coatings with improved chemical or etch resistance, due to the formation of desirable tertiary urethane linkages in the coating upon cure. Exemplary of prior patents disclosing carbamate polymers for coatings are U.S. Pat. No. 6,451,930 and U.S. Pat. No. 6,239,212.

Commercialization of carbamate finishes have been hindered by several significant or even critical technical hurdles. For example, a commercially practical finish, among other requirements, must have adequate adhesion to windshield sealants or adhesives, which are typically moisture-cure adhesives containing isocyanate groups, such as those described in U.S. Pat. No. 5,852,137.

Typically when a windshield is affixed to the body of a vehicle which has already been painted, a sealant material is used to attach the windshield to the body. However, many of the commonly available windshield adhesives do not adhere well to clearcoats that contain carbamate groups. One solution to the problem of failure of windshield sealants to adhere to carbamate containing clearcoats is to prime the clearcoat with a urethane primer wherever the adhesive is to be applied. Although effective, this method adds an additional step to the process of adhering a windshield to the vehicle body. Another solution to the problem is to add hydrolyzable silane additives to the coating to enable crosslinking between the active silane groups on the surface of the cured clearcoat and active silane groups in the moisture-cure windshield sealant to achieve windshield sealant adhesion. However, weak acid catalysts, such as phenyl acid phosphates, that are commonly used nowadays in commercial basecoats for better appearance tend to diffuse or migrate from the basecoat into the clearcoat and destroy the activity of the silane in the clearcoat.

Continuing effort has thus been directed to the achievement of primerless windshield sealant adhesion over a basecoat/carbamate clearcoat finish, while also meeting today's performance requirements, such as high gloss, DOI (distinctness of image) and low orange peel, etch, scratch and mar resistance, adhesion to additional in-line or end-of-line repair coatings, and low VOC (volatile organic content) emission requirements.

SUMMARY OF THE INVENTION

In conventional windshield boding operations at a vehicle assembly plant, the windshield is affixed to the body of a vehicle which has already been painted with a basecoat/ clearcoat finish. During this process, a bead of moisture-cure sealant material is applied along the windshield frame over the previously cured basecoat/clearcoat finish. The windshield sealant is expected to adhere to the basecoat/clearcoat finish to hold the windshield effectively in place and meet current motor vehicle safety standards (MVSS) and regulations.

During the development of etch resistant carbamate clearcoat compositions, applicants found that conventional windshield bonding adhesives showed poor or inadequate adhesion to the cured clearcoat. This poor adhesion is believed due to the phenomenon of the weak acid catalyst in the basecoat migrating into the clearcoat and deactivating the active silane groups therein. Accordingly, such migration appears to have an adverse effect on what is known as primerless windshield sealant adhesion, also referred to as primerless MVSS adhesion. Applicants were able to solve this problem of primerless windshield sealant adhesion by including a strong acid cure catalyst, in the basecoat.

The claimed method is directed to a method for achieving primerless windshield sealant adhesion over a basecoat/clearcoat finish in which the original clearcoat comprises a cured carbamate polymer or oligomer and also contains active silane groups. The method comprises:

(a) applying a basecoat composition, comprising an epoxy or epoxy-isocyanate polymer blocked sulfonic acid cure catalyst, to a substrate;

(b) applying a clearcoat composition comprising a carbamate material and active silane groups;

(c) substantially or completely curing the basecoat/clearcoat finish; and (d) applying directly to the substantially or completely cured basecoat/clearcoat finish, a windshield sealant containing active silane groups.

By the term "substantially cured" or "partially cured" is meant that, although at least some curing has occurred, further curing may occur over time. The clearcoat composition suitably comprises from about 50 to 75% by weight of binder, and the binder comprises from about 10 to 83% by weight, preferably 20 to 65%, of a carbamate polymer or oligomer, 15 to 45% by weight, preferably 30 to 40%, of melamine and 2 to 45% by weight, preferably 5 to 40%, of a silane oligomer or polymer. Preferably, the silane polymer is the polymerization product of a mixture of monomers of which, by weight, about 5 to 90% by weight, preferably 30 to 70%, are ethylenically unsaturated monomers which contain a silane functionality and about 10 to 95% , preferably 30 to 70%, are non-silane containing ethylenically unsaturated monomers of which up to about 50% by weight of the polymer may contain a hydroxyl functionality.

The claimed invention further includes a basecoat composition usable in the present method and a coated substrate having a composite coating prepared according to the present method.

Composite coatings, particularly basecoat/clearcoat finishes, prepared according to the present invention can be cured and coated with commercially available windshield sealants and have good adhesion to the sealant materials applied thereover.

The invention is based on the discovery that use of certain strong acid cure catalysts in the basecoat improves the adhesion of the cured clearcoat film to windshield bonding adhesives.

DETAILED DESCRIPTION OF THE INVENTION

As used herein, except where otherwise noted, the term "active silane group" shall mean a material containing a hydrolyzable silyl group of the formula, $—Si(R_n)X_{3-n}$, wherein this group is attached to a silyl-containing material by a silicon-carbon bond, and wherein: n is 0, 1 or 2; R is oxysilyl or unsubstituted hydrocarbyl or hydrocarbyl substituted with at least one substituent containing a member selected from the group O, N, S, P, Si; and X is a hydrolyzable moiety selected from the group $C_1$ to $C_4$ alkoxy, $C_6$ to $C_{20}$ aryloxy, $C_1$ to $C_6$ acyloxy, hydrogen, halogen, amine, amide, imidazole, oxazolidinone, urea, carbamate, and hydroxylamine. Also the term "carbamate oligomer or polymer" as used herein shall mean a urethane oligomer or polymer containing reactive urethane groups.

This invention relates to composite basecoat/clearcoat coatings useful for finishing the exterior of automobile and truck bodies and parts thereof. More particularly, this invention provides a basecoat/clearcoat finish in which the clearcoat composition comprises a carbamate polymer or oligomer, which after application and at least partial cure, the composite coating demonstrates excellent adhesion to windshield sealants. Even more particularly, this invention provides a method for obtaining windshield sealant adhesion when a commercial windshield sealant is applied over a finish having a clearcoat comprising a cured or at least partially cured carbamate polymer or oligomer. The method is especially useful for achieving primerless windshield bonding capability to motor vehicles such as an automobiles and trucks during original manufacture at a vehicle assembly plant.

Typically, an automotive substrate such as the vehicle body is first coated with an inorganic rust-proofing zinc or iron phosphate layer over which is provided a primer which can be an electrocoated primer. A typical electrocoated primer comprises a cathodically deposited epoxy modified resin. Optionally, a primer surfacer can be applied over the primer coating to provide for better appearance and/or improved adhesion of the basecoat to the primer coat. A pigmented basecoat or colorcoat is next applied. A typical basecoat comprises a pigment, which may include metallic flakes in the case of a metallic finish, and a polyester or acrylourethane film-forming binder.

A clear topcoat (clearcoat) may then be applied to the pigmented basecoat (colorcoat). The colorcoat and clearcoat are preferably deposited to have thicknesses of about 0.1–2.5 mils and 1.0–3.0 mils, respectively. In the present invention, the clearcoat comprises a carbamate oligomer or polymer.

As indicated above, according to the present invention, for the purpose of adhering windshield adhesives, for example, such as those disclosed in U.S. Pat. No. 5,852,137, hereby incorporated by reference, over a basecoat/clearcoat finish, the basecoat is formulated to contain an epoxy or epoxy-isocyanate blocked strong acid cure catalyst. A plurality or mixture of such cure catalysts can be employed. It is believed that use of such strong acid catalysts effectively prevents their migration or diffusion into the clearcoat finish from destroying the activity of the active silane groups in the clearcoat, which active groups are used to achieve the desired primerless windshield sealant adhesion. By adding a catalyst of this kind to the basecoat, also avoided is having to increase the silane level in the clearcoat which would be very expensive.

Furthermore, the overall appearance of the clearcoat is surprisingly not adversely affected by inclusion of strong acid catalysts in the basecoat. This is because the strong acid catalysts used herein are effectively blocked with a polymeric compound which now require high cure temperature (i.e., 120° C. or higher) to release the strong acid to catalyze the binder system of the basecoat. The nature of high deblocking temperatures make the catalysts behave more like a weak acid catalyst for an overall slow cure rate of the basecoat. Thus, the replacement of the weak catalyst, such as phenyl acid phosphate with a catalyst of the kind described above would not alter the balance of cure between the basecoat and the clearcoat. As a result, the overall good appearance (such as gloss and DOI and low orange peel) of the clearcoat is retained.

As indicated above, the basecoat composition of this invention should be free of any unblocked alkyl or aryl acid phosphates, such as phenyl acid phosphate, which destroy the activity of the silane in the clearcoat. However, in an alternate embodiment, epoxy or epoxy-isocyanate polymer blocked weak acids such as phenyl acid phosphates may be used without destroying the clearcoat primerless MVSS adhesion. Still, there is always a possibility that a small portion of alkyl acid phosphate might be released early and migrate into the clearcoat to destroy the silane activity in this embodiment. Thus, this application is mainly focused on the use of an epoxy or epoxy-isocyanate polymer-blocked strong acid catalyst in the basecoat. Such strong acids are less effective for silane condensation crosslinking reactions, and early release of such strong acids would not affect the silane activity in the clearcoat.

Preferably, the film-forming polymers to be cross-linked in the basecoat are all non-silane containing, although small amounts of silane containing polymers or compounds may be present for improved adhesion to the clearcoat. Since, the basecoat is therefore not cured by silane condensation reactions, the catalysts employed to catalyze the basecoat generally do not catalyze, to any appreciable extent, the silane-containing polymers in the clearcoat and deactivate the silane groups therein. By the term "non-silane-containing" is meant that the film-forming polymers in the binder of the composition for the basecoat do not contain alkoxysilane, silanol, and/or acetoxysilane groups, or like reactive silicon-containing groups, the reaction of which causes curing. However, although the film-forming portion of the binder is mostly or essentially, if not completely, non-silane containing, a small amount of acrylosilane resin, siloxane, and/or silane coupling agent, in the amount of 0–20% by weight of binder, preferably 0–10%, may be used in the basecoat, as indicated above, to improve adhesion of the basecoat to the clearcoat. The term "primarily non-silane containing basecoat" is intended to mean that the basecoat is effectively cured by other than a silane curing catalyst, but that small amounts of silane groups may be present.

The clearcoat composition employed in the present invention comprises, as a film-forming polymer, a carbamate polymer or oligomer, herein also referred to as a urethane polymer or oligomer. The carbamate material should contain at least two reactive (i.e., crosslinkable) sites, at least one of which is a carbamate group. Preferably the material contains a plurality of carbamate groups. The carbamate groups may be primary or secondary, although this invention is particularly directed to carbamate materials with secondary carbamate groups. Oligomeric materials are also generally preferred.

Suitable carbamate oligomers have a weight average molecular weight of about 75–2,000, and preferably about 75–1,500. All molecular weights disclosed herein are determined by GPC (gel permeation chromatography) using a polystyrene standard.

A wide variety of carbamate oligomers which contain curable carbamate groups may be employed in the present invention. However, a preferred carbamate oligomer is prepared by reacting a polyisocyanate, preferably an aliphatic polyisocyanate, with a monofunctional alcohol to form an oligomeric compound having multiple secondary carbamate groups, as described in WO 00/55229, the disclosure of which is incorporated herein by reference. This reaction is performed under heat, preferably in the presence of catalyst as is known in the art Various polyisocyanate compounds can be used in the preparation of these secondary carbamate compounds. The preferable polyisocyanate compounds are isocyanate compounds having 2 to 3 isocyanate groups per molecule. Typical examples of polyisocyanate compounds are, for instance, 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Trimers of diisocyanates also can be used such as the trimer of hexamethylene diisocyanate (isocyanurate) which is sold under the tradename Desmodur® N-3390, the trimer of isophorone diisocyanate (isocyanurate) which is sold under the tradename Desmodur® Z-4470 and the like. Polyisocyanate functional adducts can also be used that are formed from any of the forgoing organic polyisocyanate and a polyol. Polyols such as trimethylol alkanes like trimethylol propane or ethane can be used. One useful adduct is the reaction product of tetramethylxylidene diisocyanate and trimtheylol propane and is sold under the tradename of Cythane® 3160. When the curable carbamate functional resin of the present invention is used in exterior coatings, the use of an aliphatic or cycloaliphatic isocyanate is preferable to the use of an aromatic isocyanate, from the viewpoint of weatherability and yellowing resistance.

Any monohydric alcohol can be employed to convert the above polyisocyanates to secondary carbamate groups. Some suitable monohydric alcohols include methanol, ethanol, propanol, butanol, isopropanol, isobutanol, hexanol, 2-ethylhexanol, and cyclohexanol.

In an alternate embodiment, these lower molecular weight secondary carbamate materials can be formed by reacting a monofunctional isocyanate, preferably an aliphatic monofunctional isocyanate, with a polyol, as will be appreciated by those skilled in the art.

Typical of such above-mentioned low molecular weight secondary carbamate materials are those having the following structural formulas:

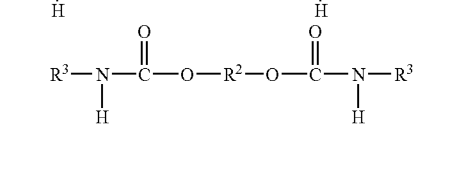

where R is a multifunctional oligomeric or polymeric material; $R^1$ is a monovalent alkyl or cycloalkyl group, preferably a monovalent $C_1$ to $C_{12}$ alkyl group or $C_3$ to $C_6$ cycloalkyl group, or a combination of alkyl and cycloalkyl groups; $R^2$ is a divalent alkyl or cycloalkyl group, preferably a divalent $C_1$ to $C_{12}$ alkyl group or $C_3$ to $C_6$ cycloalkyl group, or a combination of divalent alkyl and cycloalkyl groups; and $R^3$ is either R or $R^1$ as defined above.

Carbamate functional polymers, particularly those with secondary carbamate groups, may also be used in the practice of this invention. Such polymers are well-known in the art. Such polymers can be prepared in a variety of ways and are typically acrylic, polyester, or polyurethane containing materials with pendant and/or terminal carbamate groups. Acrylic polymers are generally preferred in automotive clearcoats.

Mixtures of the polymeric and oligomeric carbamate functional compounds may also be utilized in the coating composition of the present invention.

The binder used in the clearcoat generally contains about 5–60% by weight, preferably 10–40%, of these carbamate functional materials.

The film-forming binder portion of the clearcoat composition used in this invention also contains from about 15 to 45%, preferably 20 to 40%, by weight, based on the weight of the binder, of a crosslinking component containing at least two reactive (i.e., crosslinkable) sites, at least one of which is reactive with carbamate functional groups. A number of crosslinking materials are known that can react with carbamate groups and form desired urethane linkages in the cured coating, which linkages are desirable for durability, resistance to attack by acid rain and other environmental pollutants, and scratch and mar resistance. These include aminoplast resins such as melamine formaldehyde resins (including monomeric or polymeric melamine resin and partially or fully alkylated melamine resin), urea resins (e.g., methylol ureas such as urea formaldehyde resin, alkoxy ureas such as butylated urea formaldehyde resin), and phenoplast resins such as phenol/formaldehyde adducts.

Aminoplast crosslinking agents, most preferably a partially or fully alkylated aminoplast crosslinking agent, are typically included in the film-forming compositions of the present invention. These crosslinking agents are well known in the art and contain a plurality of functional groups, for example, alkylated methylol groups, that are reactive with the pendant or terminal carbamate groups present in the film-forming polymer and are thus capable of forming the desired urethane linkages with the carbamate functional polymers. Most preferably, the crosslinikng agent is a monomeric or polymeric melamine-formaldehyde condensate that has been partially or fully alkylated, that is, the melamine-formaldehyde condensate contains methylol groups that have been further etherified with an alcohol, preferably one that contains 1 to 6 carbon atoms. Any monohydric alcohol can be employed for this purpose, including methanol, ethanol, n-butanol, isobutanol, and cyclohexanol. Most preferably, a blend of methanol and n-butanol is used. Such crosslinking agents typically have a weight average molecular weight of about 500–1,500, as determined by GPC using polystyrene as the standard.

Suitable aminoplast resins of the forgoing type are commercially available from Cytec Industries, Inc. under the trademark CYMEL® and from Solutia, Inc. under the trade name RESIMENE®.

Mixtures of crosslinking agents can also be utilized in the clearcoat composition of the present invention.

In addition to the carbamate materials and crosslinking components described above, the film-forming portion of the clearcoat composition also preferably contains a reactive silane compound containing one or more active silane groups. This material can be an oligomeric or polymeric material including a polysiloxane based material. Organosilane polymers, herein also referred to as silane polymers, are generally preferred. Suitable silane polymers have a weight average molecular weight of about 1000–30,000, preferably about 2000–10,000.

A wide variety of organiosilane polymers which contain active silane groups may be employed in the present invention. Acrylic polymers are generally preferred in automotive clearcoats. A preferred acrylosilane polymer is the polymerization product of, by weight, about 10–95%, preferably 30–70% ethylenically unsaturated non-silane containing monomers and about 5–90%, preferably 30–70% ethylenically unsaturated silane containing monomers, based on the weight of the silane polymer. Suitable ethylenically unsaturated non-silane containing monomers are alkyl acrylates, alkyl methacrylates and any mixtures thereof, where the alkyl groups have 1–12 carbon atoms, preferably 3–8 carbon atoms.

Suitable alkyl methacrylates used to form a silane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohlexyl methacrylate, trimethylcyclohexl acrylate, isobornyl methacrylate, isobornyl acrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to non-silane containing alkyl acrylates or methacrylates, other polymerizable monomers, up to about 50% by weight of the polymer, can be also used in an acrylosilane polymer for the purpose of achieving the desired physical properties such as appearance, hardness, mar resistance, and good balance of windshield adhesion and recoat adhesion, i.e., adhesion to additional repair coatings applied over the clearcoat. Exemplary of such other monomers are styrene, methyl styrene, acrylamide, acrylonitrile, methacrylonitrile, and the like. Styrene can be used in the range of 0–50% by weight. For further improvement in recoat adhesion, hydroxy functional monomers are preferably incorporated into the organosilane polymer to produce a polymer having a hydroxy number of 4 to 160, preferably 10 to 50 (mg KOH/g resin solids). This typically translates into use of hydroxy functional monomers in the range of about 1–10% by weight of the polymer.

Suitable hydroxy functional non-silane containing ethylenically unsaturated monomers include, for example, hydroxy alkyl (meth)acrylates meaning hydroxy alkyl acrylates and hydroxy alkyl methacrylates having 1–4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like. The presence of hydroxy functional monomers enables additional crosslinking to occur between the hydroxy groups and silane moieties on the silane polymer and/or between the hydroxy groups with other crosslinking groups (such as melamine groups) that may be present in the clear coat composition, to control silicon stratification in the final clear coat and provide optimal recoat adhesion, while maintaining primerless windshield sealant adhesion.

A suitable silane containing monomers useful in forming an acrylosilane polymer is an alkoxysilane having the following structural formula:

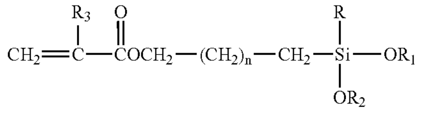

where R is either $CH_3$, $CH_3CH_2$, $CH_3O$, or $CH_3CH_2O$; $R_1$ and $R_2$ are independently $CH_3$ or $CH_3CH_2$; and $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gamma-acryloxypropyl trimethoxysilane and the methacrylatoalkoxy silanes, such as gamma-methacryloxypropyl trimethoxysilane (Silquest® A-174 from Crompton), and gamma-methacryloxypropyltris(2-methoxyethoxy) silane.

Other suitable alkoxy silane monomers have the following structural formula:

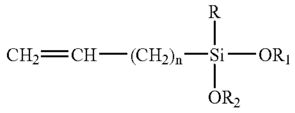

where R, $R_1$ and $R_2$ are as described above and n is 0 or a positive integer from 1 to 10. Examples of such alkoxysilanes are the vinylalkoxy silanes, such as vinyltrimethoxy silane, vinyltriethoxy silane and vinyltris(2-methoxyethoxy) silane.

Other suitable silane containing monomers are ethylenically unsaturated acryloxysilanes, including acrylatoxy silane, methacrylatoxy silane and vinylacetoxy silanes, such as vinylmethyldiacetoxy silane, acrylatopropyl triacetoxy silane, and methacrylatopropyltriacetoxy silane. Of course, mixtures of the above-mentioned silane containing monomers are also suitable.

Consistent with the above mentioned components, an example of a hydroxy functional acrylosilane polymer useful in the practice of this invention is composed of polymerized monomers of styrene, an ethylenically unsaturated alkoxy silane monomer which is either an acrylate, methacrylate or vinyl alkoxy silane monomer or a mixture of these monomers, a nonfunctional acrylate or methacrylate or a mixture of these monomers and a hydroxy alkyl acrylate or methacrylate that has 1–4 carbon atoms in the alkyl group such as hydroxy ethyl acrylate, hydroxy propyl acrylate, hydroxy butyl acrylate, hydroxy ethyl methacryl ate, hydroxy propyl methacrylate, hydroxy butyl methacrylate and the like or a mixture of these monomers.

One preferred acrylosilane polymer contains the following constituents: about 1–30% by weight styrene, about 1–95% by weight gamma-methacryloxypropyl trimethoxysilane, and about 1–30% by weight isobutyl methacrylate, 1–30% by weight butyl acrylate, and less than 10% by weight, more preferably about 0–10% by weight hydroxy propyl acrylate. The total percentage of monomers in the polymer equal 100%. This polymer preferably has a weight average molecular weight ranging from about 1,000 to 20,000.

One particularly preferred acrylosilane polymer contains about 10% by weight styrene, about 65% by weight gamma-methacryloxypropyl trimethoxysilane, about 15% by weight of nonfunctional acrylates or methacrylates such as trimethylcyclohexyl methacrylate, butyl acrylate, and iso-butyl methacrylate and any mixtures thereof, and about 10% by weight of hydroxy propyl acrylate. Silane functional macromonomers also can be used in forming the silane polymer. For example, one such macromonomer is the reaction product of a silane containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above-mentioned silane functional macromonomers are those having the following structural formula:

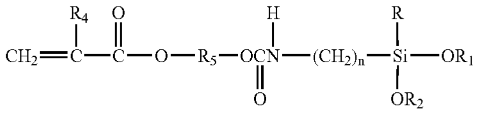

where R, $R_1$, and $R_2$ are as described above; $R_4$ is H or $CH_3$, $R_5$ is an alkylene group having 1–8 carbon atoms and n is a positive integer from 1–8.

The silane materials can also be oligomeric in nature. These materials are well known in that art.

Mixtures of polymeric and oligomeric hydroxy functional silane compounds may also be utilized in the present invention.

Optionally, other film-forming and/or crosslinking solution polymers may be included in the clearcoat composition. Examples include conventionally known acrylics, cellulosics, isocyanates, blocked isocyanates, urethanes, polyesters, epoxies or mixtures thereof. One preferred optional film-forming polymer is a polyol, for example an acrylic polyol solution polymer of polymerized monomers. Such monomers may include any of the aforementioned alkyl acrylates and/or methacrylates and in addition, hydroxy alkyl acrylates and/or methacrylates. Suitable alkyl acrylates and methacrylates have 1–12 carbon atoms in the alkyl groups. The polyol polymer preferably has a hydroxyl number of about 50–200 and a weight average molecular weight of about 1,000–200,000 and preferably about 1,000–20,000. To provide the hydroxy functionality in the polyol, up to about 90% preferably 20 to 50%, by weight of the polyol comprises hydroxy functional polymerized monomers. Suitable monomers include hydroxy alkyl acrylates and methacrylates, for example, such as the hydroxy alkyl acrylates and methacrylates listed hereinabove and mixtures thereof. Other polymerizable non-hydroxy-containing monomers may be included in the polyol polymer component, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide, methylol acrylamide, and the like, and mixtures thereof.

One example of an acrylic polyol polymer comprises about 10–20% by weight of styrene, 40–60% by weight of alkyl methacrylate or acrylate having 1–6 carbon atoms in the alkyl group, and 10–50% by weight of hydroxy alkyl acrylate or methacrylate having 1–4 carbon atoms in the alkyl group. One such polymer contains about 15% by weight styrene, about 29% by weight iso-butyl methacrylate, about 20% by weight 2-ethylhexyl acrylate, and about 36% by weight hydroxy propylacrylate.

In addition to the above polymeric components, a dispersed polymer may optionally be included in the coating composition. Polymers dispersed in an organic (substantially non-aqueous) medium have been variously referred to, in the art, as a non-aqueous dispersion (NAD) polymer, a non-aqueous microparticle dispersion, a non-aqueous latex, or a polymer colloid. See generally, Barrett, DISPERSION POLYMERIZATION IN ORGANIC MEDIA (John Wiley 1975). See also U.S. Pat. Nos. 4,147,688; 4,180,489; 4,075,141; 4,415,681; 4,591,533; and 5,747,590, hereby incorporated by reference. In general, the non-aqueous dispersed polymer is characterized as a polymer particle dispersed in an organic media, which particle is stabilized by what is known as steric stabilization. According to the prior art, steric stabilization is accomplished by the attachment of a solvated polymeric or oligomeric layer at the particle-medium interface The dispersed polymers are known to solve the problem of cracking typically associated with clear coatings, particularly coatings containing silane compounds, and are used in an amount varying from about 0 to 30% by weight, preferably about 10 to 20%, of total weight of resin solids in the composition. The ratio of the silane compound to the dispersed polymer component of the composition suitably ranges from 5:1 to 1:10, preferably 4:1 to 1:5. To accommodate these relatively high concentrations of dispersed polymers, it is desirable to have reactive groups (e.g., hydroxy groups) on the solvated portion of the dispersed polymer, which reactive groups make the polymers compatible with the continuous phase of the system.

A preferred composition for a dispersed polymer that has hydroxy functionality comprises a core consisting of about 25% by weight of hydroxyethyl acrylate, about 4% by weight of methacrylic acid, about 46.5% by weight of methyl methacrylate, about 18% by weight of methyl acrylate, about 1.5% by weight of glycidyl methacrylate to provide a crosslinked core and about 5% of styrene. The solvated arms that are attached to the core contain 97.3% by weight of a pre-polymer and about 2.7% by weight of glycidyl methacrylate, the latter for crosslinking or anchoring of the arms. A preferred pre-polymer contains about 28% by weight of butyl methacrylate, about 15% by weight of ethyl methacrylate, about 30% by weight of butyl acrylate, about 10% by weight of hydroxyethyl acrylate, about 2% by weight of acrylic acid, and about 15% by weight of styrene.

The dispersed polymer can be produced by well known dispersion polymerization of monomers in an organic solvent in the presence of a steric stabilizer for the particles. The procedure has been described as one of polymerizing the monomers in an inert solvent in which the monomers are soluble but the resulting polymer is not soluble, in the presence of a dissolved amphoteric stabilizing agent.

A curing catalyst is typically added to the clearcoat composition for catalyzing the curing (i.e., crosslinking) between carbamate moieties and melamine moieties and/or between the other reactive components present in the composition. While a wide variety of curing catalysts can be used, strong mineral acids such as sulfonic acid are generally preferred. Sulfonic acids, such as dodecylbenzene sulfonic acid, either blocked or unblocked, are effective catalysts. Typical blocked acid catalyst are dodecyl benzene sulfonic acid blocked with an amine, such as amino methyl propanol or dimethyl oxazolidine. Blocked toluene sulfonic acid can also be used. Other useful catalysts will readily occur to one skilled in the art. Preferably, the catalysts are used in the amount of about 0.1 to 5.0%, based on the total weight of the binder.

To improve the weatherability especially of a clear finish produced by the present coating composition, an ultraviolet light stabilizer or a combination of ultraviolet light stabilizers can be added to the clearcoat composition in the amount of about 0.1–10% by weight, based on the total weight of the binder. Such stabilizers include ultraviolet light absorbers, screeners, quenchers, and specific hindered amine light stabilizers. Also, an antioxidant can be added, in the about 0.1–5% by weight, based on the total weight of the binder. Typical ultraviolet light stabilizers that are useful include benzophenones, triazoles, triazines, benzoates, hindered amines and mixtures thereof.

A suitable amount of water scavenger such as trimethyl orthoacetate, triethyl orthoformate, tetrasilicate and the like (preferably 2 to 7% by weight of binder) is typically added to the clearcoat composition for extending its pot life. About 3% microgel (preferably acrylic) and 1% hydrophobic silica may be employed for rheology control. The composition may also include other conventional formulation additives such as flow control agents, for example, such as Resiflow® S (polybutylacrylate), BYK® 320 and 325 (high molecular weight polyacrylates).

In the present invention, the forgoing composition is used as a clear coating composition, i.e. containing no pigments. Small amounts of pigments, however, can be added to the clearcoat to eliminate undesirable color in the finish such as yellowing. The composition preferably also has a relatively high solids content of about 45–90% by weight of binder and correspondingly about 10–55% by weight of an organic liquid carrier which can be a solvent for the binder or a mixture of solvents. The clearcoat described herein is also preferably a low VOC (volatile organic content) coating composition, which means a coating that includes less than 0.6 kilograms of organic solvent per liter (5 pounds per gallon) of the composition as determined under the procedure provided in ASTM D3960.

To achieve primerless windshield bonding capability over the clearcoat, in the basecoat employed in the present invention, a suitable amount of a certain strong acid curing catalyst is added to enable curing of the basecoat. As indicated above, the catalyst is chosen from materials which do not interfere significantly with the activity of the silane groups in clearcoat. A suitable amount of strong acid curing catalyst in the basecoat is 0.1 to 5%, preferably 0.1 to 2%, more preferably 0.2 to 0.8% by weight, based on the weight of the binder in the basecoat.

According to the present method, when the clearcoat is applied over the basecoat, at least a portion of the catalyst in the basecoat may diffuse or migrate from the basecoat into the clearcoat. However, upon baking or curing of the basecoat and clearcoat together, the curing catalyst has a minimum effect on the condensation (i.e., crosslinking) of the active silane groups in the same clearcoat and accordingly does not destroy the clearcoat primeness MVSS adhesion. Evidently, migration of the basecoat catalyst is dependent on the size and nature of the blocking agents for the acid catalyst. Larger molecules will lead to less migration of the catalyst from the basecoat to the clearcoat, and that would also contribute to keep the clearcoat silane from being interfered by the basecoat catalysts.

While a wide variety of strong mineral acid curing catalysts can be used, as with the clearcoat, sulfonic acids are generally preferred. Sulfonic acids, such as blocked dodecylbenzene sulfonic acid or blocked alkyl naphthalene sulfonic acid are effective catalysts. Typical blocked acid catalysts are dodecyl benzene sulfonic acid blocked with an epoxy polymer or an mono- or di- or poly-isocyanate modified epoxy polymer (also referred to herein as an epoxy-isocyanate polymer). An epoxy polymer or isocyanate modified epoxy polymer that unblocks at 120° C. or above is most preferred to effectively slow down the cure of the basecoat and achieve better appearance of the overall finish. The epoxy blocked sulfonic acids are characterized wherein the sulfonic acid group is reacted with an epoxide to provide a beta-hydroxy sulfonic acid ester. Suitable epoxy compounds for preparing an epoxy blocked sulfonic acid include diglycidyl ethers of bisphenol A or bisphenol F; diglycidyl ethers of a glycol, such as ethylene glycol, propylene glycol or butanediol; monoglycidyl ethers of $C_1$ to $C_{18}$ alpha olefin epoxides and 1,2-epoxycyclohexane. Such materials may be prepared from the sulfonic acid in accordance with procedures well known in the art. Typically, the epoxy blocked esters are prepared from reacting the sulfonic acid with a mono-, di- or poly-epoxy compound and then, optionally reacting the resulting beta-hydroyalkyl sulfonic acid ester with a mono-, di-, or poly-isocyanate.

Preferred catalyst are epoxy blocked or isocyanate modified epoxy blocked sulfonic acid catalysts having the following structural formula:

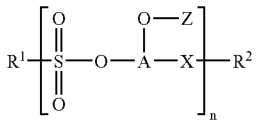

wherein

Z is H or an isocyanate derived moiety of the following structure:

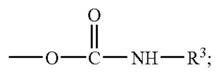

$R^1$ is a monovalent or divalent $C_{1-18}$ alkyl, $C_{1-18}$ alkylene, or $C_{1-18}$ mono- or di-alkyl substituted phenyl or naphthyl, optionally substituted with 1 to 2 sulfonic acid groups;

$R^2$ is H, mono or polyvalent $C_{1-18}$ alkyl, bisphenol A or bisphenol F, optionally substituted with a glycidyl or glycidyl derived moiety, such as

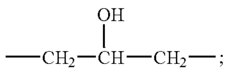

$R^3$ is $C_{1-18}$ alkyl, alkenyl, cycloalkyl, aryl or a polymeric moiety, optionally containing an ester, an ether or isocyanate functional or isocyanate derived group;

A is a multivalent linking group moiety derived from the ring opening reaction of an epoxy group with the following structure:

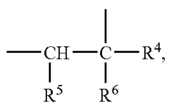

wherein $R^4$ is H or $—CH_2—$; $R^5$ and $R^6$ may be the same or different and each of $R^5$ and $R^6$ is H, $C_1$–$C_{12}$ alkyl or $R^4$ and $R^5$ together form a $C_6$–$C_{12}$ cycloalkyl;

n is 1–10 wherein if n is greater than 1, at least one of $R^1$, $R^2$ or $R^3$ is at least difunctional;

X is optional, and may be carboxy or oxy; and the molecular weight of the catalyst is at least about 1000.

The sulfonic acids that are suitable for use in making the above catalysts include mono- and di-sulfonic acids such as methane sulfonic acid, toluene sulfonic acid, dodecyl benzene sulfonic acid, alkyl naphthyl sulfonic acid, dialkylnaphthyl sulfonic acid, dialkyl naphthalene disulfonic acid, and the like.

Epoxy resins suitable for making the catalysts include diglycidyl ethers of bisphenol A and bisphenol F, diglycidyl ethers of polypropylene glycol, the mono glycidyl ethers of $C_1$ to $C_{18}$ alcohols, the glycidyl ester of $C_1$ to $C_{18}$ carboxylic acids, $C_2$ to $C_{18}$ alpha-olefin epoxides, isobutylene epoxides with a molecular weight of between about 350 to 2000, cycloaliphatic epoxy resins such as derived from the peracid epoxidation of cycloaliphatic compounds. Example of such cycloaliphatic epoxy resins are 3,4-epoxycyclohexylmethyl-3,4-epoxy-cyclohexane carboxylate, vinyl cyclohexane dioxide, 2-(3,4-epoxycyclohexyl-5,5-spiro-3,4-epoxy) cyclohexane-metadioxane, bis (3,4-epoxycyclohexyl) adipate.

Suitable isocyanates include 1,6-hexane diisocyanate, trimethyl hexane diisocyanate, isophorone diisocyanate, toluene diisocyanate, methylene dianiline derived products, such as, diphenylmethane-4,4'-diisocyanate, bis(4-isocyanatocyclohexyl) methane or tetramethylxylene diisocyanate, polyesters or polyethers terminated with an isocyanate group such as the reaction product of one mole of a polypropylene glycol with two moles of isophorone diisocyanate, or the reaction product of a polyester diol prepared from neopentyl glycol with adipic acid and an excess of isophorone diisocyanate.

Such catalysts are more fully described in U.S. Pat. No. 5,102,961, hereby incorporated by reference.

In the typical case, the basecoat employed in the present invention involves crosslink chemistry, for example carbamate-melamine and/or hydroxy-melamine and/or hydroxy-isocyanate crosslink chemistry, which is promoted by strong mineral acids, like the sulfonic acids described above and does not require silane curing catalysts. However, the basecoat of the present invention may also include additional catalysts which are known to promote silane curing such as tin catalyst or other Lewis acid catalysts. Examples of such catalysts include dibutyl tin dilaurate, dibutyl tin diacetate, dibutyl tin dioxide, dibutyl tin dioctoate, tin octoate, aluminum titanate, aluminum chelates, zirconium chelate and the like. However, since these catalyst are known silane curing catalysts which promote silane condensation reactions, they can only be employed in amounts which do not impede the primerless windshield bonding capability of the clearcoat. Any mixture of the aforementioned catalysts may be useful, as well. Preferably, these additional catalysts are only used in amounts up to about 2% by weight of the binder. Other useful catalysts that can be used will readily occur to one skilled in the art.

In general, the composition of the basecoat is not limited by the present invention except to the extent that it must contain a catalyst such as those listed above which does not interfere with the activity of silane groups in the clearcoat. Preferred basecoats comprise a polyester or polyester urethane in combination with a melamine crosslinking agent and a polyol. Suitable polyols include acrylic, polyester, polyester urethane, or an acrylic urethane polyol having a hydroxy number of 60–160. Such polyols may contribute to recoat adhesion over a silane clearcoat by hydroxy groups on the polyol reacting with some of the unreacted or residual silane groups in the clearcoat even though the clearcoat has substantially or partially cured. The binder used in the basecoat may also optionally contain 0–40% of a carbamate oligomer or polymer for the clearcoat to achieve a balance of cure with the clearcoat. Any of the carbamates described above can be used.

Additional film-forming and/or crosslinking solution polymers may also be included in the basecoat. Any of the additional film-forming and crosslinking solution polymers listed above for use in the clearcoat may be used in the basecoat. An example of a suitable basecoat, in addition to pigments, aluminum flakes, and UV absorber, comprises by weight of composition, about 24% microgel for rheology and flake control, 38% melamine formaldeyde resin, 8% branched polyester resin, 15% carbamate resin, 3% cellulose acetate butyrate for further rheology and flake control, 10% silica dispersion for further rheology and flake control, polymer-blocked dodecylbezene sulfonic acid catalyst, and 2% dibutyl tin diacetate.

Although not wishing to be bound by theory, it is surmised that the replacement of weak acid catalysts such as phenyl acid phosphate with the sulfonic acid catalyst in the preferred basecoat composition reduces the level of self condensation of the alkoxysilane and/or silanol or their reaction with the hydroxy-functional resin in the clearcoat to form Si—O—C bonds, both of which inhibits primerless windshield sealant adhesion.

A variety of pigments and metallic flakes may be employed in the basecoat, as would be apparent to those skilled in the art. Typical pigments in the basecoat composition include the following: metallic oxides such as titanium dioxide, zinc oxide, iron oxides of various colors, carbon black, filler pigments such as talc, china clay, barytes, carbonates, silicates and a wide variety of organic colored pigments such as quinacridones, copper phthalocyanines, perylenes, azo pigments, indanthrone blues, carbazoles such as carbozole violet, isoindolinones, isoindolones, thioindigo reds, benzimidazolinones, metallic flake pigments such as aluminum flake, pearlescent flakes, and the like.

The specific pigment to binder ratio can vary widely so long as it provides the requisite hiding, color and/or effect at the desired film thickness and application solids, as would be apparent to those skilled in the art. The pigments can be introduced into the coating composition by first forming a mill base or pigment dispersion with any of the aforementioned polymers used in the coating composition or with another compatible polymer or dispersant by conventional techniques, such as high speed mixing, sand grinding, ball milling, attritor grinding or two roll milling. The mill base is then blended with the other constituents used in the coating composition.

Both the basecoat and clearcoat compositions employed in the present invention may also include other conventional formulation additives such as flow control agents, for example, such as Resiflow®S (polybutylacrylate), BYK®. 320 and 325 (high molecular weight polyacrylates); and rheology control agents, such as fumed silica.

Conventional solvents and diluents are used to disperse and/or dilute the above mentioned polymers. Typical solvents and diluents include toluene, xylene, butyl acetate, acetone, methyl isobutyl ketone, methyl ethyl ketone, methanol, isopropanol, butanol, hexane, acetone, ethylene glycol, monoethyl ether, VM and P naptha, mineral spirits, heptane and other aliphatic, cycloaliphatic, aromatic hydrocarbons, esters, ethers and ketones and the like.

According to the present invention, each of the coating compositions described herein can be applied by conventional techniques such as spraying, electrostatic spraying, dipping, brushing, flowcoating and the like. The preferred techniques are spraying and electrostatic spraying. In the present invention, the clearcoat is typically applied over the basecoat which may be dried to a tack-free state and cured or preferably flash dried for a short period before the clearcoat is applied. After application of both the basecoat and clearcoat, the composite basecoat/clearcoat finish is typically baked at 100–150° C. for about 15–30 minutes to form a dried and at least partially cured coating about 0.1–3.0 mils thick.

It has become customary, particularly in the auto industry, to apply a clear clearcoat over a basecoat by means of a "wet-on-wet" application, i.e., the clearcoat is applied to the basecoat without curing or completely drying the basecoat. The coated substrate is then heated for a predetermined time period to allow simultaneous curing of the base and clear coats.

After application and at least partial cure, the composite coating of the present invention is particularly useful in providing excellent adhesion to windshield sealants without use of a primer that meets current motor vehicle safety standards. The cured film also has excellent adhesion to additional repair coatings, such as a repair basecoat followed by a repair clearcoat, which are sometimes necessary to apply to the substrate having cured thereon a cured basecoat and a cured clearcoat layer, to repair blemishes and defects in the original basecoat/clearcoat finish, since defects in the finish may occasionally occur during the original manufacturing process, necessitating on-site repair.

The following Examples illustrate the invention. All parts and percentages are on a weight basis unless otherwise indicated.

EXAMPLES

The invention is further described in the following non-limiting examples. All parts and percentage in the examples are on a weight basis unless otherwise indicated. All molecular weights disclosed herein are determined by GPC using a polystyrene standard.

The following resins were prepared and used as indicated in the Clearcoat and Basecoat Examples described hereinafter.

Resin Example 1

Preparation of a Carbamate Functional Oligomer for Use in Clearcoat and Basecoat Examples A carbamate functional oligomer was prepared by charging the following ingredients into a reaction flask equipped as above:

| | Parts by Weight (g) |
|---|---|
| Portion I | |
| Isocyanurate of hexane diisocyanate (Desmodur ® 3300 from Bayer Corporation) | 1608 |
| Aromatic 100 Solvent (from Exxon Mobil Chemical Co) | 707 |
| Dibutyl tin dilaurate | 0.3 |
| Portion II | |
| Cyclohexanol | 783 |
| 2-Ethyl hexanol | 68 |
| Portion III | |
| Butanol | 347 |
| Total | 3513 |

Portion I was pre-mixed and charged into the reaction flask and heated to 100° C. under agitation and a nitrogen blanket. Then Portion II was added over a 120 minute period, in order to keep the exotherm temperature at or below 103–107° C. The reaction mixture was then held at 100° C. while mixing until essentially all of the isocyanate was reacted as indicated by infrared scan. When NCO was absent, the reaction mixture was cooled to below 100° C. and Portion III was then added to adjust the solids content of the resulting solution to 70% by weight solids.

The resulting solution contained the following constituents HDI trimer/Cyclohexanol/2-Ethyl Hexanol in a weight ratio of 65/32/3.

Resin Example 2

Preparation of Hydroxy Functional Acrylosilane Polymers 1–3 and Hydroxy-Free Monofunctional Acrylosilane Polymer 4 for Use in Clearcoat Examples Acrylosilane polymer solutions were prepared by copolymerizing in the presence of a 2/1 Solvesso 100 Aromatic Solvent/butanol mixture, monomer mixtures of 10 parts by weight of styrene (S), 10% parts by weight of hydroxypropyl acrylate (BPA), 65% parts by weight of methacryloxypropyl trimethoxy silane (MAPTS) (Silquest® A-174 from Crompton), 3 parts by weight of butyl acrylate (BA), and 12 parts by weight of isobutyl methacrylate (IBMA) in the presence of 8 parts by weight of Vazo® 67. The resulting polymer solution has a 71% solids content and a viscosity of F—R on the Gardner Holdt scale measured at 25° C. The polymer compositions are described in Table 2 below and they all have a weight average molecular weight of approximately 4,500 gram/mole.

Resin Example 3

Preparation of an Acrylic Microgel for Use in Clearcoat and Basecoat Examples A methyl methacrylate/glycidyl methacrylate copolymer was prepared as an intermediate stabilizing polymer used in the synthesis of the below acrylic microgel resin. This stabilizing polymer was prepared by charging the following to a nitrogen blanketed flask equipped as above:

| | Parts by Weight (g) |
|---|---|
| Portion I | |
| n-Butyl acetate | 195.800 |
| Portion II | |
| Methyl methacrylate | 139.000 |
| n-Butyl acetate | 14.410 |
| Glycidyl methacrylate | 13.060 |
| Glycidyl methacrylate/12-Hydroxystearic acid copolymer (60% by weight solids solution of 89.2% 12-HAS/10.8% GMA in a 80/20 blend of toluene and petroleum naphtha) | 181.660 |
| Petroleum Naphtha (Exxsol ® D-3135 from Exxon) | 40.570 |
| n-Butyl acetate | 13.060 |
| Portion III | |
| 2,2'-azobis(2-methylbutyronitrile) | 8.010 |
| n-Butyl acetate | 71.590 |
| Petroleum Naphtha (Exxsol ® D-3135 from Exxon) | 74.330 |
| Portion IV | |
| 4-tert-Butyl catechol | 0.040 |
| n-Butyl acetate | 2.690 |
| Portion V | |
| Methacrylic acid | 2.710 |
| n-Buyl acetate | 6.020 |
| Potion VI | |
| N,N'-dimethyl dodecyl amine | 0.360 |
| n-Butyl acetate | 2.690 |
| Total | 766 |

Portion I was charged to the reactor and brought to a temperature of 96 to 100° C. Portions II and III were separately premixed and then added concurrently over a 180 minute period, while maintaining a reaction temperature of 96 to 100° C. The solution was then held for 90 minutes. In sequence, Portions IV, V, and VI were separately premixed and added to the reactor. The reaction solution was then heated to reflux and held until the acid number is 0.5 or less. The resulting polymer solution has a 40% solids content.

The acrylic microgel resin was then prepared by charging the following to a nitrogen blanketed flask equipped as above:

| | Parts by Weight (g) |
|---|---|
| Portion I | |
| Methyl methacrylate | 15.187 |
| Mineral spirits (Exxsol ® D40 from Exxon) | 97.614 |
| Methyl methacrylate/Glycidyl methacrylate Stabilizer copolymer (prepared above) | 4.678 |
| Heptane | 73.638 |
| 2,2'-azobis(2-methylbutyronitrile) (Vazo 67 from DuPont) | 1.395 |

-continued

| | Parts by Weight (g) |
|---|---|
| Portion II | |
| N,N-dimethylethanolamine | 1.108 |
| Methyl methacrylate | 178.952 |
| Methyl methacrylate/Glycidyl methacrylate stabilizer copolymer (prepared above) | 58.271 |
| Glycidyl methacrylate | 2.816 |
| Methacrylic acid | 2.816 |
| Styrene | 75.302 |
| Hydroxy Ethyl Acrylate | 23.455 |
| Heptane | 198.512 |
| Mineral Spirits (Exxsol ® D40 from Exxon) | 32.387 |
| Portion III | |
| 2,2'-azobis(2-methylbutyronitrile) (Vazo 67 from DuPont) | 2.024 |
| Toluene | 12.938 |
| Heptane | 30.319 |
| Portion IV | |
| Heptane | 9.588 |
| Portion V | |
| Resimene ® 755 | 246.3 |
| Total | 1067.3 |

Portion I was charged into the reaction vessel, heated to its reflux temperature, and held for 60 minutes. Portions II and III were premixed separately and then added simultaneously over a 180 minute period to the reaction vessel mixed while maintaining the reaction mixture at its reflux temperature. Portion IV was then added. The reaction solution was then held at reflux for 120 minutes and then 246.3 pounds of the solvent was stripped. The resin was then cooled to 60° C. and mixed with Portion V. Mixing was continued for 30 minutes.

The resulting polymer solution has a weight solids of 70%, and a viscosity of 50 centipoise (By Brookfield Model RVT, Spindle #2, at 25° C.).

Resin Example 4

Preparation of a Polyester Resin for Use in the Basecoat Examples

A polyester resin was prepared by charging the following ingredients into a reaction flask equipped with a heating mantle, stirrer, thermometer, nitrogen inlet and a reflux condenser

| | Parts by Weight (g) |
|---|---|
| Portion I | |
| Neopentyl Glycol | 180.162 |
| 1,6-Hexanediol | 53.960 |
| 1,3-Propanediol | 115.290 |
| Iso-Phthalic Acid | 94.580 |
| Adipic Acid | 111.960 |
| 1,12-Dodecanedioic Acid | 182.670 |
| Phthalic Anhydride | 63.640 |
| Mono-Butyl Tin Oxide (Fascat ® 4100 Catalyst from Atofina Chemicals) | 0.764 |
| Portion II | |
| n-Butanol | 165.370 |
| Total | 3512 |

The ingredients used in Portion I were charged into the reaction flask in the order given with mixing at and heated to 50–80° C. The reaction mixture was then held at 220–225° C. while mixing until the acid number was less than 5. After reaching an acid number of less than 5, the reaction mixture was cooled to below 110° C. and Portion II was then added to adjust the solids content of the resulting solution to 80% by weight.

The resulting solution contained the following constituents NPG/TMP/1,6-HD/IPA/AD/DDDA/PA in a weight ratio of 22.5/14.4/6.7/11.8/13.9/22.8/7.9.

Clearcoat Example

Preparation of Clearcoat Composition

The clearcoat composition was prepared by blending together the following ingredients in the order given:

TABLE 1

| | Parts by Weight |
|---|---|
| Microgel[1] | 3% |
| Melamine[2] | 22% |
| Melamine[3] | 15% |
| HALS Tinuvin 123[4] | 1.2% |
| UVA Tinuvin 928[5] | 2% |
| NAD[6] | 10% |
| Catalyst[7] | 1.2% |
| Carbamate[8] | 30.5% |
| Flow Aid[9] | 0.31% |
| Silica Dispersion[10] | 9% f.w. |
| Moisture Scalvenger[11] | 7% f.w. |
| Silane Resin[12] | 9.2% |

Table Footnotes
*All the numbers in this table are by % non-volatile, except for those noted as f.w. which means by formula weight.
[1]Resin Example 3.
[2]Resmine ® CE 4514 melamine supplied by Solutia Inc., St Louis, MO.
[3]Cymel ® 1156 melamine supplied by Cytec Industries Inc., West Patterson, New Jersey.
[4]Tinuvin ® 123 supplied by Ciba Specialty Chemicals, Tarrytown, New York.
[5]Tinuvin ® 928 supplied by Ciba Specialty Chemicals, Tarrytown, New York.
[6]Non-aqueous dispersion resin (NAD) prepared in accordance with the procedure described in the U.S. Pat. No. 5,747,590 at column 8, lines 46–68 and column 9, lines 1–25, all of which is incorporated herein by reference.
[7]Dodecyl benzene sulfonic acid salt of 2-amino-2-methyl-1-propanol supplied by King Industries, Norwalk, Connecticut.
[8]Resin Example 1.
[9]Resiflow supplied by Estron Chemicals, Inc., Parsippany, New Jersey.
[10]Fumed silica grind.
[11]Trimethyl orthoacetate supplied by Chem Central.
[12]Resin Example 2.

Basecoat Examples 1–3 and Comparative Example 4

Preparation of Basecoat Compositions

The basecoat composition was prepared by blending together the following ingredients in the order given:

TABLE 2

| | Ex. 1 | Ex. 2 | Ex. 3 | C. Ex. 4 |
|---|---|---|---|---|
| Microgel[1] | 24% | 24% | 24% | 24% |
| Melamine[2] | 38% | 38% | 38% | 38% |
| Xylene[3] | 5% f.w. | 5% f.w. | 5% f.w. | 5% f.w. |
| Polyester[4] | 8% | 8% | 8% | 8% |
| Catalyst 1[5] | 0.65% | | | |
| Catalyst 2[6] | | 0.65% | | |
| Catalyst 3[7] | | | 0.65% | |
| Catalyst 4[8] | | | | 0.65% |
| Tinuvin 328[9] | 1% | 1% | 1% | 1% |
| Carbamate[10] | 15% | 15% | 15% | 15% |
| Flow Aid[11] | 0.31% | 0.31% | 0.31% | 0.31% |
| Silica Dispersion[12] | 10% f.w. | 10% f.w. | 10% f.w. | 10% f.w. |
| Cellulose Acetate Butyrate[13] | 3% | 3% | 3% | 3% |
| Tin Catalyst[14] | 0.4% | 0.4% | 0.4% | 0.4% |
| Methanol[15] | 3% f.w. | 3% f.w. | 3% f.w. | 3% f.w. |
| Indanthrone Blue[16] | 1.2 p/b | 1.2 p/b | 1.2 p/b | 1.2 p/b |
| Carbon Black[17] | 0.55 p/b | 0.55 p/b | 0.55 p/b | 0.55 p/b |
| Quinacridone Magenta[18] | 0.23 p/b | 0.23 p/b | 0.23 p/b | 0.23 p/b |
| Aluminum Paste 1[19] | 3.94 p/b | 3.94 p/b | 3.94 p/b | 3.94 p/b |
| Aluminum Paste 2[20] | 2.88 p/b | 2.88 p/b | 2.88 p/b | 2.88 p/b |
| Titanium Dioxide[21] | 0.25 p/b | 0.25 p/b | 0.25 p/b | 0.25 p/b |

Table Footnotes
*All the numbers in this table are by % non-volatile, except for those noted as f.w. which means by formula weight.
[1]Resin Example 3.
[2]Cymel ® 1168 melamine supplied by Cytec Industries Inc., West Patterson, New Jersey.
[3]Supplied by Exxon Mobil Chemical.
[4]Resin Example 4.
[5]Dodecyl benzene sulfonic acid salt of 2-amino-2-methyl-1-propanol supplied by King Industries, Norwalk, Connecticut.
[6]Polymeric isocyanate modified epoxy blocked dodecyl benzene sulfonic acid supplied by King Industries, Norwalk, Connecticut, also under the trade name of Nacure 5414 and its preparation is best described in the U.S. Pat. No. 5,102,961, Example 1. The catalyst requires aminimum of 130° C. cure temperature to deblock the blocking polymer.
[7]Epoxy blocked Dinonylnaphthalene sulfonic acid supplied by King Industries, Norwalk, Connecticut, also under the trade name of Nacure 1419 and the catalyst requires a minimum of 150° C. cure temperature to deblock the blocking polymer.
[8]Phenyl acid phosphate supplied by Rhodia Inc., Cranbury, NJ
[9]Tinuvin ® 328 supplied by Ciba Specialty Chemicals, Tarrytown, New York.
[10]Resin Example 1.
[11]Resiflow supplied by Estron Chemicals, Inc., Parsippany, New Jersey.
[12]Fumed silica grind.
[13]Cellulose Acetate Butyrate supplied by Eastman Chemical Company,
[14]Dibutyl Tin Diacetate supplied by Atofina ChemicalsInc.,
[15]Methyl alcohol supplied by Chem Central.
[16]Indanthrone Blue supplied by Ciba Specialty Chemicals - Pigments Div, Tarrytown, New York.
[17]Carbon Black supplied by Columbian Chemicals Company,
[18]Quinacridone Magenta supplied by Ciba Specialty Chemicals - Pigments Div, Tarrytown, New York.
[19]STAPA MOBILUX 33313 supplied by Eckart America,
[20]ALUMINUM PASTE TCR-3070A supplied by Toyal America Inc.,
[21]Titanium Dioxide supplied by DuPont Titanium Technologies,

Paint Testing

The basecoating compositions of basecoat Examples 1–3 and Comparative Example 4 were reduced to 19 seconds on a #4 Ford cup with butyl acetate and automated spray to separate steel panels which were already coated with a layer each of electrocoat and primer surfacer. After 5' flash, the clearcoat composition prepared above was automated spray over the basecoats. The primer surfacer used is commercially available from DuPont under DuPont Code of 708S43302 (Light Titanium). The electrocoat used is commercially available from DuPont under the name of ED5050.

The basecoat Examples 1–3 and Comparative Example 4 were applied by bell in two coats with 60 seconds flash in between to a primed, electrocoated steel substrate under a booth condition of 75° F. and 55% humidity.

Testing Procedures Used in the Examples

1. MVSS (Motor Vehicle Safety Standard) Primerless Windshield Adhesion Test

For the testing of adhesion to windshield adhesives, the clear composition was applied to the base-coated panels after 5-minute basecoat flash, to a filmbuild wedge. The applied clearcoat was allowed to flash in air for approximately 10 minutes before baking. All the clear and basecoated panels of Examples 1–3 and Comparative Example 4 were baked at 135° C. for 10 minutes. The final dry film thicknesses were 35–50 microns for the Medium Steel Blue basecoats and a wedge of 2.5 microns to 75 microns for the clearcoat. Within 12 hours of bake, a bead of windshield adhesive was applied to the clearcoat surface primerless such that the beads cover the entire wedge filmbuilds of 2.5 microns to 75 microns (quick knife adhesion test according to GM4352M and GM9522P specifications published by General Motors Corporation). The windshield adhesive used is commercially available from Dow Essex Specialty Products company and is identified as Betaseal™ 15625.

The windshield adhesive bead was allowed to cure for 72 hours at 73° F. (23° C.) and 50% humidity. The size adhesive beads were about 6×6×250 mm and the cured beads were cut with a razor blade across the entire clearcoat filmbuild range. The interval between the cuts was at least 12 mm apart. The desirable result is 100% cohesive failure (CF) of the adhesive beads, rather than a failure due to a loss of adhesion between the adhesive and the clearcoat or within the clearcoat or under layers. The areas which starts to show loss of adhesion between the adhesive and the clearcoat were measured for filmbuilds. Generally, areas of low filmbuilds of the clearcoat and high filmbuild area of the basecoat would have a stronger tendency of losing adhesion of the adhesive beads due to migration of the clearcoat silane resin and basecoat catalyst between the two layers. The results for Examples 1–3 and Comparative Example 4 are reported in Table 3, below.

2. Surface Appearance Test

For appearance evaluation, the clearcoat composition was applied to the base-coated panels after a 5-minute basecoat flash, to a constant filmbuild. The applied basecoats and clearcoats were baked at 140° C. for 30 minutes. The final dry film thicknesses were 15–20 microns for the Medium Steel Blue basecoats and 45–50 microns for the clearcoat. The appearances of the panels were measured by QMS (Quality Measurement Systems from Autospec America) which provides a combined measurement of gloss, DOI (distinctness of image), and orange peel. Typical QMS numbers for automotive finishes are 45–80 with higher numbers meaning better appearance.

Paint Results

The results of adhesion to windshield adhesive beads and the appearance of the composite coating of this invention are summarized in Table 3:

TABLE 3

| Basecoat | Catalyst | FB of Clearcoat Which Failed the MVSS Primerless Compatibility | Appearance by QMS** |
|---|---|---|---|
| Ex. 1 | DDBSA-Amp* | 12 micron | 48 |
| Ex. 2 | DDBSA-Epoxy-Isocyanate Polymer | 15 micron | 62 |
| Ex. 3 | DNNSA-Epoxy | 11 microns | 60 |
| C. Ex. 4 | Phenyl Acid Phosphate | 40 microns | 56 |

Table Footnotes
*Amp stands for 2-amino-2-methyl-1-propanol.
**Scale of 1–100: the higher the QMS number, the better the appearance As Table 3 shows, although phenyl acid phosphate catalyst could provide acceptable clearcoat appearance, its primerless adhesion to MVSS adhesive lost at filmbuilds less than 40 microns. The acceptable filmbuild to lose primeness MVSS adhesion is less than 25 microns, as required by the automakers. While, though use of AMP-blocked DDBSA significantly improved the clearcoat adhesion to the adhesives without primer, its appearance also dropped significantly. The catalysts which provide both acceptable primerless adhesion and better appearance than phenyl acid phosphate are the epoxy-isocyanate blocked DDBSA and the epoxy-blocked DNNSA.

Various other modifications, alterations, additions or substitutions of the process and compositions of this invention will be apparent to those skilled in the art without departing from the spirit and scope of this invention. This invention is not limited by the illustrative embodiments set forth herein, but rather is defined by the following claims.

What is claimed is:

1. A method for obtaining primerless windshield sealant adhesion over a basecoat/clearcoat finish in which the original clearcoat comprises a cured carbamate polymer or oligomer and also contains active silane groups, which method comprises:

(a) applying a basecoat composition, comprising an epoxy blocked or epoxy-isocyanate polymer blocked sulfonic acid curing catalyst, to a substrate;

(b) applying a clearcoat composition comprising a carbamate material and active silane groups;

(c) substantially or completely curing the basecoat/clearcoat finish; and (d) applying directly to the substantially or completely cured basecoat/clearcoat finish a windshield sealant containing active silane groups.

2. The method according to claim 1 wherein the clearcoat is applied wet-on-wet over the basecoat.

3. The method according to claim 2 wherein the basecoat and clearcoat are cured together.

4. The method according to claim 1 wherein the epoxy blocked sulfonic acid catalyst deblocks at 120° C. or above.

5. The method according to claim 4 wherein the epoxy blocked sulfonic acid curing catalyst is the reaction product of a mono- or di-sulfonic acid with a mono-, di- or polyepoxide.

6. The method according to claim 4 wherein the epoxy blocked sulfonic acid curing catalyst is represented by the structural formula:

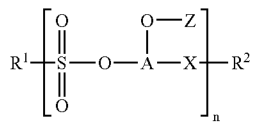

wherein

Z is H or an isocyanate derived moiety of the following structure:

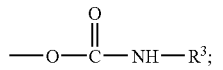

$R^1$ is a monovalent or divalent $C_{1-18}$ alkyl, $C_{1-18}$ alkylene, or $C_{1-18}$ mono- or di-alkyl substituted phenyl or naphthyl, optionally substituted with 1 to 2 sulfonic acid groups;

$R^2$ is H, mono or polyvalent $C_{1-18}$ alkyl, bisphenol A or bisphenol F, optionally substituted with a glycidyl or glycidyl derived moiety, such as

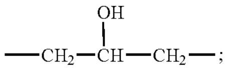

$R^3$ is $C_{1-18}$ alkyl, alkenyl, cycloalkyl, aryl or a polymeric moiety, optionally containing an ester, an ether or isocyanate functional or isocyanate derived group;

A is a multivalent linking group moiety derived from the ring opening reaction of an epoxy group with the following structure:

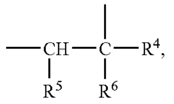

wherein $R^4$ is H or —$CH_2$—; $R^5$ and $R^6$ may be the same or different and each of $R^5$ and $R^6$ is H, $C_1$–$C_{12}$ alkyl or $R^4$ and $R^5$ together form a $C_6$–$C_{12}$ cycloalkyl;

n is 1–10 wherein if n is greater than 1, at least one of $R^1$, $R^2$ or $R^3$ is at least difunctional; and X is optional, and may be carboxy or oxy; and the molecular weight of the catalyst is at least about 1000.

7. The method according to claim 1 wherein the active silane groups in the clearcoat are provided by an acrylosilane polymer which is the reaction product of a mixture of monomers of which from about 5 to 90% by weight, based on the weight of the polymer, are ethylenically unsaturated monomers which contain a silane functionality and of which from about 10 to 95% by weight, based on the weight of the acrylosilane polymer are non-silane containing ethylenically unsaturated monomers of which up to about 50% by weight of the polymer may contain a hydroxyl functionality.

8. The method according to claim 1, wherein the basecoat composition contains about 0.1–5% by weight, based on the weight of the binder, of said epoxy blocked sulfonic acid catalyst.

9. A substrate coated according to the method of claim 1.

10. A composite coating, comprising:

(a) at least one layer of basecoat composition, comprising an epoxy blocked sulfonic acid curing catalyst, applied to a substrate;

(b) at least one layer of a clearcoat composition, comprising a carbamate material and also containing active silane groups, applied over said basecoat;

wherein said composite coating (a) plus (b) is dried and cured or substantially cured over the substrate to provide a basecoat/clearcoat finish over the substrate.

11. The composite coating according to claim 10 formed as an exterior finish on an automobile or truck.

12. An automobile or truck exterior body coated with the dried and cured composite coating of claim 10.

* * * * *